United States Patent
Cho et al.

(10) Patent No.: US 10,021,611 B2
(45) Date of Patent: Jul. 10, 2018

(54) METHOD AND APPARATUS FOR ESTABLISHING CELLULAR SESSION IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/768,615

(22) PCT Filed: Feb. 25, 2014

(86) PCT No.: PCT/KR2014/001505
§ 371 (c)(1),
(2) Date: Aug. 18, 2015

(87) PCT Pub. No.: WO2014/129870
PCT Pub. Date: Aug. 28, 2014

(65) Prior Publication Data
US 2015/0382264 A1 Dec. 31, 2015

Related U.S. Application Data

(60) Provisional application No. 61/768,552, filed on Feb. 25, 2013, provisional application No. 61/821,728, filed on May 10, 2013.

(51) Int. Cl.
*H04W 80/04* (2009.01)
*H04W 36/14* (2009.01)
(Continued)

(52) U.S. Cl.
CPC ............ *H04W 36/14* (2013.01); *H04L 69/14* (2013.01); *H04W 36/22* (2013.01); *H04W 76/10* (2018.02);
(Continued)

(58) Field of Classification Search
CPC ..... H04W 84/12; H04W 80/04; H04W 84/18; H04W 88/06; H04W 74/08
See application file for complete search history.

(56) References Cited

U.S. PATENT DOCUMENTS

2007/0116012 A1   5/2007   Chang et al.
2008/0161042 A1   7/2008   Lee et al.
(Continued)

FOREIGN PATENT DOCUMENTS

| CN | 102017708 | 4/2011 |
|---|---|---|
| JP | 2013042499 A | 2/2013 |
| WO | 2012165809 | 12/2012 |

OTHER PUBLICATIONS

European Patent Office Application No. 14754266.6, Search Report dated Jun. 28, 2016, 6 pages.
(Continued)

*Primary Examiner* — Hassan Phillips
*Assistant Examiner* — Prenell Jones
(74) *Attorney, Agent, or Firm* — Lee Hong Degerman Kang Waimey

(57) ABSTRACT

A method and apparatus for establishing a session of a cellular system in a wireless communication system is provided. According to embodiments of the present invention, the establishment of the session of the cellular system may be triggered by a network when a session of a Wi-Fi system already exists. By using the session of the cellular
(Continued)

system and the session of the Wi-Fi system, simultaneous transmission through the cellular system and the Wi-Fi system can be achieved.

10 Claims, 21 Drawing Sheets

(51) Int. Cl.
   *H04W 80/10* (2009.01)
   *H04L 29/06* (2006.01)
   *H04W 36/22* (2009.01)
   *H04W 88/06* (2009.01)
   *H04W 76/10* (2018.01)
   *H04W 84/04* (2009.01)
   *H04W 84/12* (2009.01)

(52) U.S. Cl.
   CPC ......... *H04W 80/10* (2013.01); *H04W 88/06* (2013.01); *H04W 84/042* (2013.01); *H04W 84/12* (2013.01)

(56) References Cited

U.S. PATENT DOCUMENTS

| | | |
|---|---|---|
| 2008/0316970 A1 | 12/2008 | Choi |
| 2009/0088159 A1 | 4/2009 | Wu et al. |
| 2009/0280812 A1* | 11/2009 | Cheng ................ H04W 76/046 455/436 |
| 2011/0075605 A1* | 3/2011 | De Pasquale .......... H04B 7/022 370/328 |
| 2012/0140743 A1* | 6/2012 | Pelletier ............ H04W 72/0453 370/335 |
| 2012/0208506 A1* | 8/2012 | Hirano ................... H04L 63/08 455/411 |
| 2013/0016696 A1 | 1/2013 | Adjakple et al. |
| 2013/0040683 A1* | 2/2013 | Siomina ........... H04W 28/0236 455/517 |
| 2013/0041981 A1 | 2/2013 | Kim et al. |
| 2013/0329583 A1* | 12/2013 | Vrzic ................... H04W 36/30 370/252 |
| 2014/0153482 A1* | 6/2014 | Schmidt ............... H04W 72/12 370/328 |
| 2014/0187199 A1* | 7/2014 | Yan ...................... H04W 48/02 455/410 |
| 2014/0256334 A1* | 9/2014 | Kazmi ................. H04W 28/18 455/450 |
| 2014/0341109 A1* | 11/2014 | Cartmell ............... H04L 45/308 370/328 |
| 2015/0201335 A1* | 7/2015 | De Pasquale .......... H04B 7/022 370/329 |
| 2015/0382340 A1* | 12/2015 | Pandey ................ H04W 72/04 455/452.1 |
| 2016/0374137 A1* | 12/2016 | Adjakple ........... H04W 76/025 |
| 2017/0332272 A1* | 11/2017 | Adjakple ......... H04W 28/0252 |

OTHER PUBLICATIONS

PCT International Application No. PCT/KR2014/001505, Written Opinion of the International Searching Authority dated Jun. 20, 2014, 1 page.

State Intellectual Property Office of the People's Republic of China Application Serial No. 201480017171.3, Office Action dated Dec. 27, 2017, 8 pages.

* cited by examiner

FIG. 4

| Frame control | Persistent /ID | Address 1 | Address 2 | Address 3 | Sequence control | Address 4 | Sequence control | QoS control | HT control | Frame body | FCS |

METHOD AND APPARATUS FOR ESTABLISHING CELLULAR SESSION IN WIRELESS COMMUNICATION SYSTEM

CROSS-REFERENCE TO RELATED APPLICATIONS

This application is the National Stage filing under 35 U.S.C. 371 of International Application No. PCT/KR2014/001505, filed on Feb. 25, 2014, which claims the benefit of U.S. Provisional Application No. 61/768,552, filed on Feb. 25, 2013 and 61/821,728, filed on May 10, 2013, the contents of which are all hereby incorporated by reference herein in their entirety.

BACKGROUND OF THE INVENTION

Field of the Invention

The present invention relates to wireless communications, and more specifically, to a method and apparatus for establishing a cellular session in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless local area network (WLAN) system. The cellular system may be one of a 3rd generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information there between, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In general, in an interworking system of the cellular system and the WLAN system, all data flows transmitted/received through a secondary RAT system (e.g., Wi-Fi system) as well as a primary RAT system (e.g., cellular system) may be controlled by a device operating as a local mobility anchor (LMA). When a session for the Wi-Fi system already exists, a method for establishing a session for the cellular system may be required for simultaneous transmission.

SUMMARY OF THE INVENTION

The present invention relates to wireless communications, and more specifically, to a method and apparatus for establishing a cellular session in a wireless communication system. The present invention provides a method for establishing a local mobility anchor (LMA)-based cellular session, which is triggered by a network or a user equipment (UE), for simultaneous transmission in a converged communication system of a cellular system and a Wi-Fi system. That is, the present invention provides a method for establishing an additional cellular session when a Wi-Fi session for the same packet data network (PDN) connection already exists.

In an aspect, a method for establishing, by an entity of a primary radio access technology (RAT) system, a session in a wireless communication system is provided. The method includes receiving a measurement result for a secondary RAT system from a multi-RAT device, determining a routing type for a data flow, which is being transmitted through the secondary RAT system, based on quality of service (QoS) for the data flow and the received measurement result, and establishing a session of the primary RAT system with the multi-RAT device.

The method may further include, before receiving the measurement result, transmitting a measurement configuration for the secondary RAT system to the multi-RAT device. The measurement result for the secondary RAT system may be based on the measurement configuration.

The measurement configuration may be triggered by one of an eNodeB (eNB), a mobility management entity (MME), or a packet data network (PDN) gateway (P-GW).

The measurement result may be received via a tracking area update (TAU) request message.

The measurement result may be received via one of a connection request message, connection setup complete message, or a measurement report message.

The connection setup complete message may include a "logMeasAvailable" parameter which is set to "true".

The QoS may include at least one of a quality class identifier (QCI), an allocation and retention priority (ARP), bit rate of traffic per bearer, and bit rates of traffic per group of bearers.

The establishing the session of the primary RAT system may include transmitting one of a radio resource control (RRC) connection release message, a paging message, or a non-access stratum (NAS) attach request message to the multi-RAT device.

The primary RAT system may be a 3rd generation partnership project (3GPP) long-term evolution (LTE) system, and the secondary RAT system may be an institute of electrical and electronics engineers (IEEE) 802.11 system.

The entity of the primary RAT system may be one of an eNodeB (eNB), a mobility management entity (MME), or a new entity.

In another aspect, a method for establishing, by a multi radio access technology (RAT) device, a session in a wireless communication system is provided. The method includes transmitting an attach message, which includes a request type and a packet data network (PDN) connection handover type, to an entity of a primary RAT system, transmitting a measurement result on associated access points (APs) of a secondary RAT system, and receiving an attach accept message from the entity of the primary RAT system. The attach accept message includes an identifier (ID) of a bearer which is subject to simultaneous transmission through the primary RAT system and the secondary RAT system, a routing type for the bearer, and a routing rule for the bearer.

The attach message may further include at least one of an ID of the multi-RAT device, Internet protocol (IP) address, an ID of bearers, a request routing type for each bearer and a request routing rule for each bearer.

The request type may indicate a handover.

The PDN connection handover type may indicate one of a user plane (U-plane) switch, U-plane aggregation or U-plane segregation.

The method may further include performing data transmission based on the routing type for the bearer, and the routing rule for the bearer.

Additional cellular data flow session can be effectively established.

BRIEF DESCRIPTION OF THE DRAWINGS

FIG. 4 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
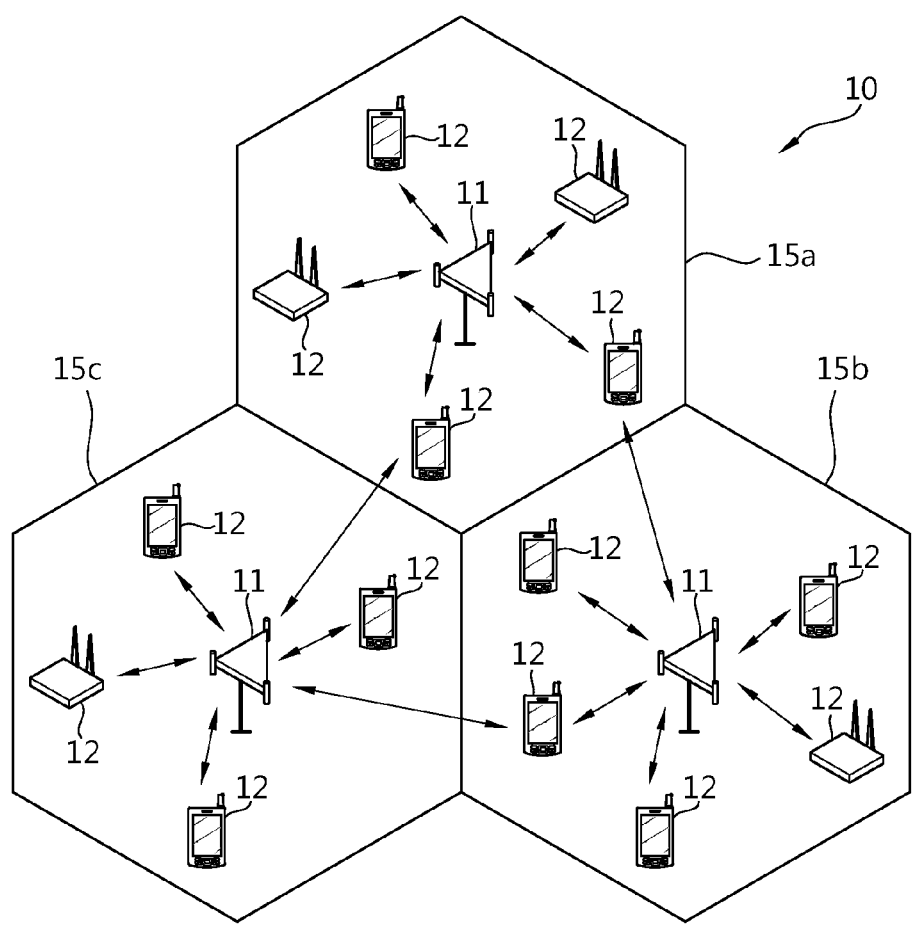
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
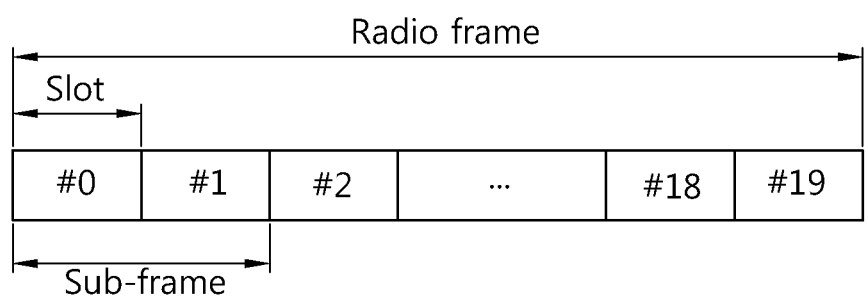
FIG. 2 shows an example of a radio frame structure of 3GPP LTE.

FIG. 2 shows an example of a radio frame structure of 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
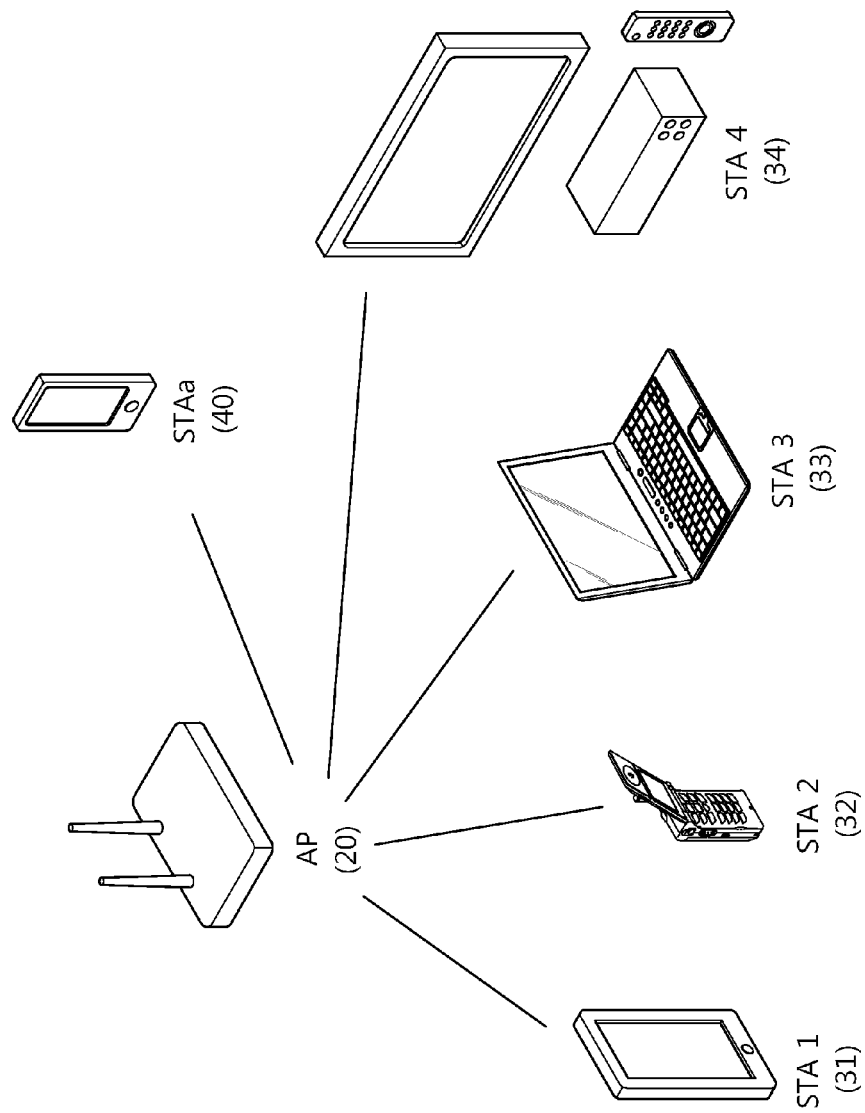
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

| | Authentication | Association |
|---|---|---|
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
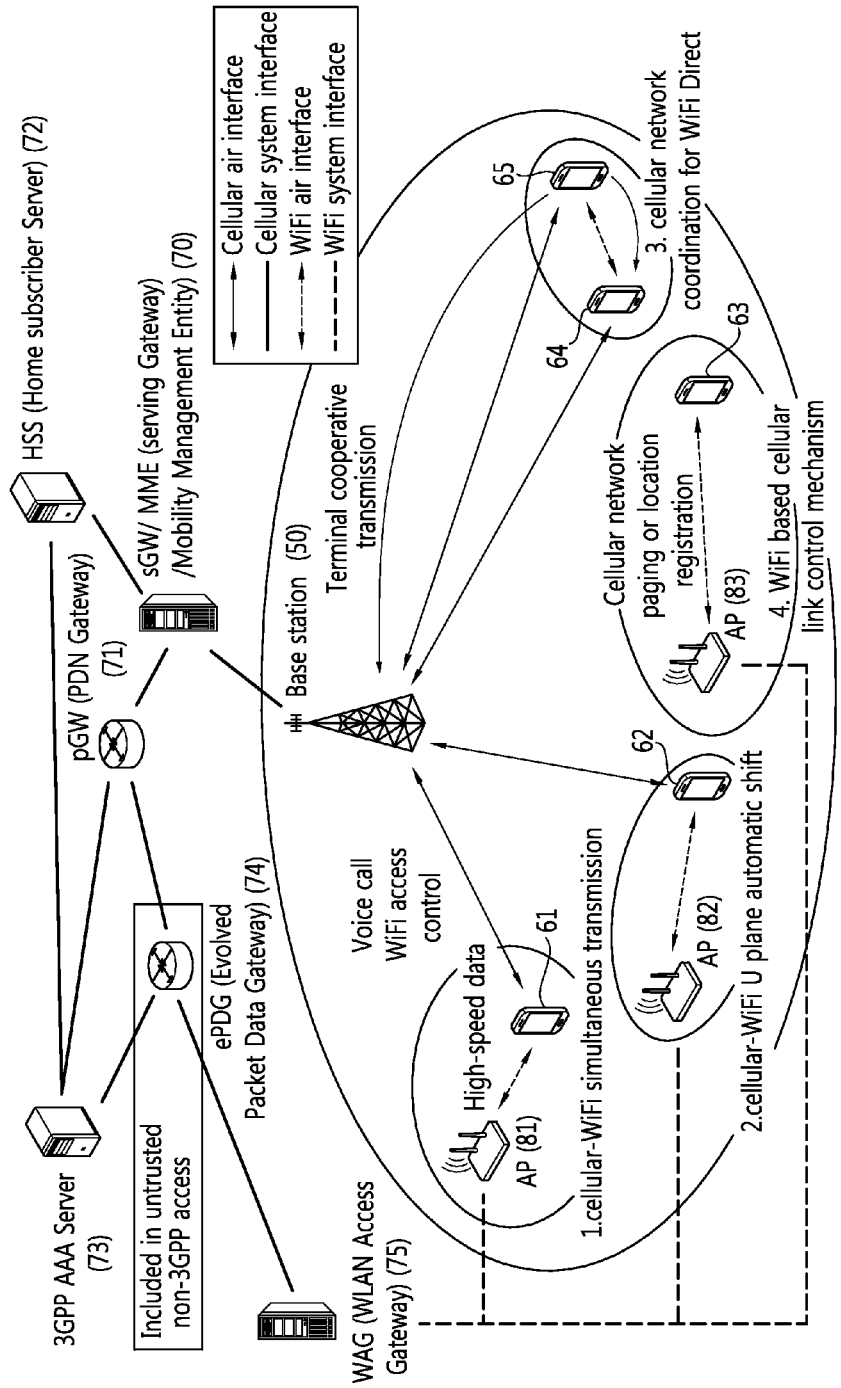
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and a home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (ePDG) 74 through the cellular system interface. The ePDG 74 may be included only in un-trusted non-3GPP access. The ePDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

In general, in an interworking system of the cellular system and the WLAN system, all data flows may be transmitted and/or received simultaneously through a plurality of RAT systems (e.g., primary RAT system, secondary RAT system). In addition, all data flows transmitted/received through a secondary RAT system (e.g., Wi-Fi system) as well as a primary RAT system (e.g., cellular system) may be controlled by a device operating as a local mobility anchor (LMA). For example, referring to FIG. 5, data to be transmitted through a cellular system and data to be transmitted through a Wi-Fi system always go through the P-GW. That is, In FIG. 5, a device serving as an LMA may be the P-GW. In this regard, a term "LMA" used in a proxy mobile Internet protocol (PMIP) protocol may be called a different term in another protocol, such as home agent (HA).

When data flows are transmitted through the plurality of RAT systems simultaneously in the converged communication system of the cellular system and the Wi-Fi system, scenarios for simultaneous transmission may be classified into U-Plane separation for the same data flow (or, bandwidth/U-plane aggregation) and U-plane separation for different data flows (or, bandwidth/U-plane segregation).

Figure 6:
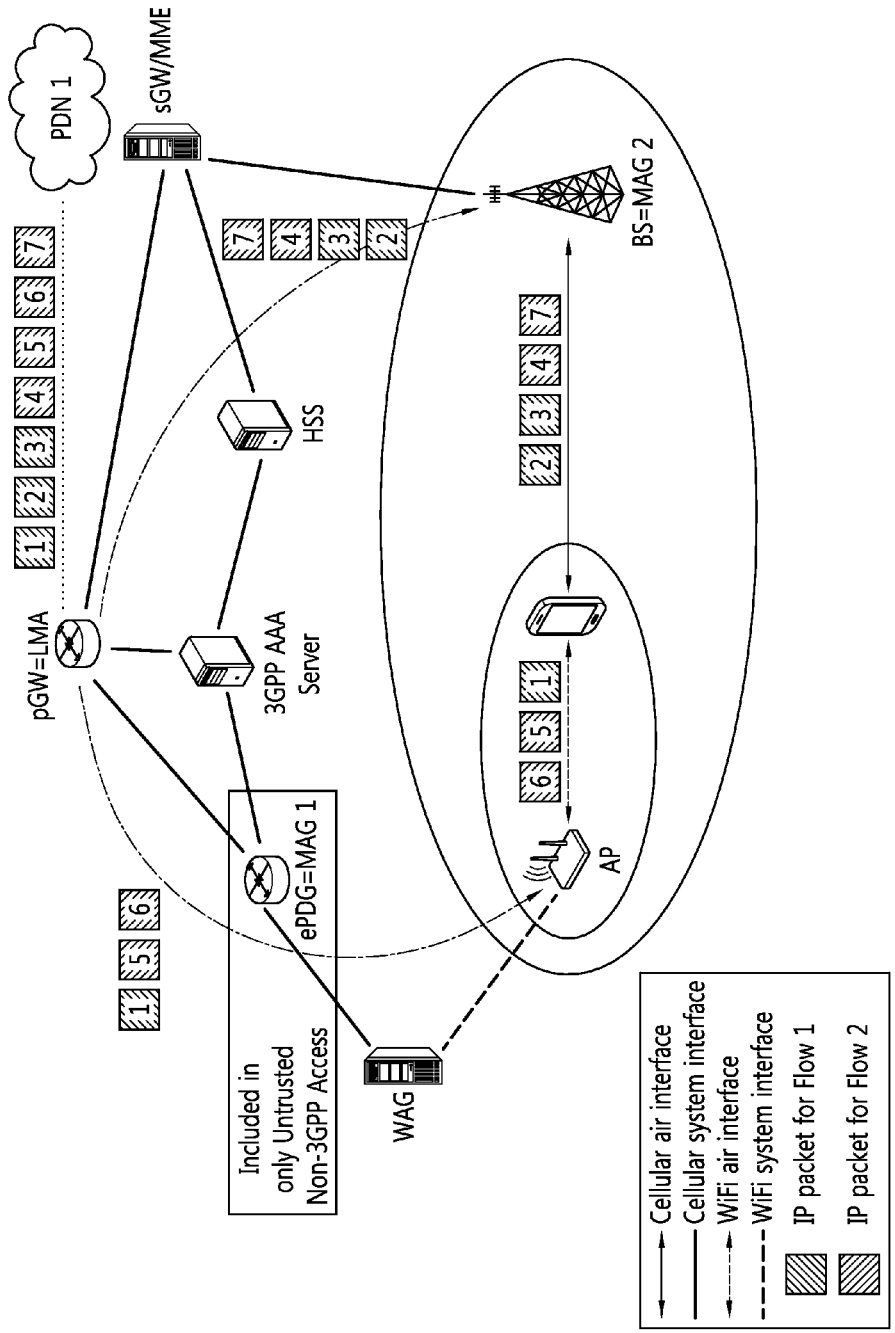
FIG. 6 shows an example of IP flow mobility in a converged communication system of a cellular system and a Wi-Fi system.

FIG. 6 shows an example of IP flow mobility in a converged communication system of a cellular system and a Wi-Fi system. FIG. 6 shows U-plane separation for the same data flow, i.e., bandwidth/U-plane aggregation.

Referring to FIG. 6, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packet 1 in the IP packet for flow 1 is transmitted to the UE through the Wi-Fi system by going through an ePDG and/or a WAG, and IP packets 2 and 3 are transmitted to the UE through the cellular system by going through a BS. In this case, the ePDG or the WAG may be a mobile access gateway (MAG) in the Wi-Fi system, and the BS may be a MAG in the cellular system. In the IP packet for flow 2, the IP packets 5 and 6 are transmitted to the UE through the Wi-Fi system by going through the PDG and/or the WAG, and IP packets 4 and 7 are transmitted to the UE through the cellular system by going through the BS. That is, IP packets for different flows are aggregated each other.

Figure 7:
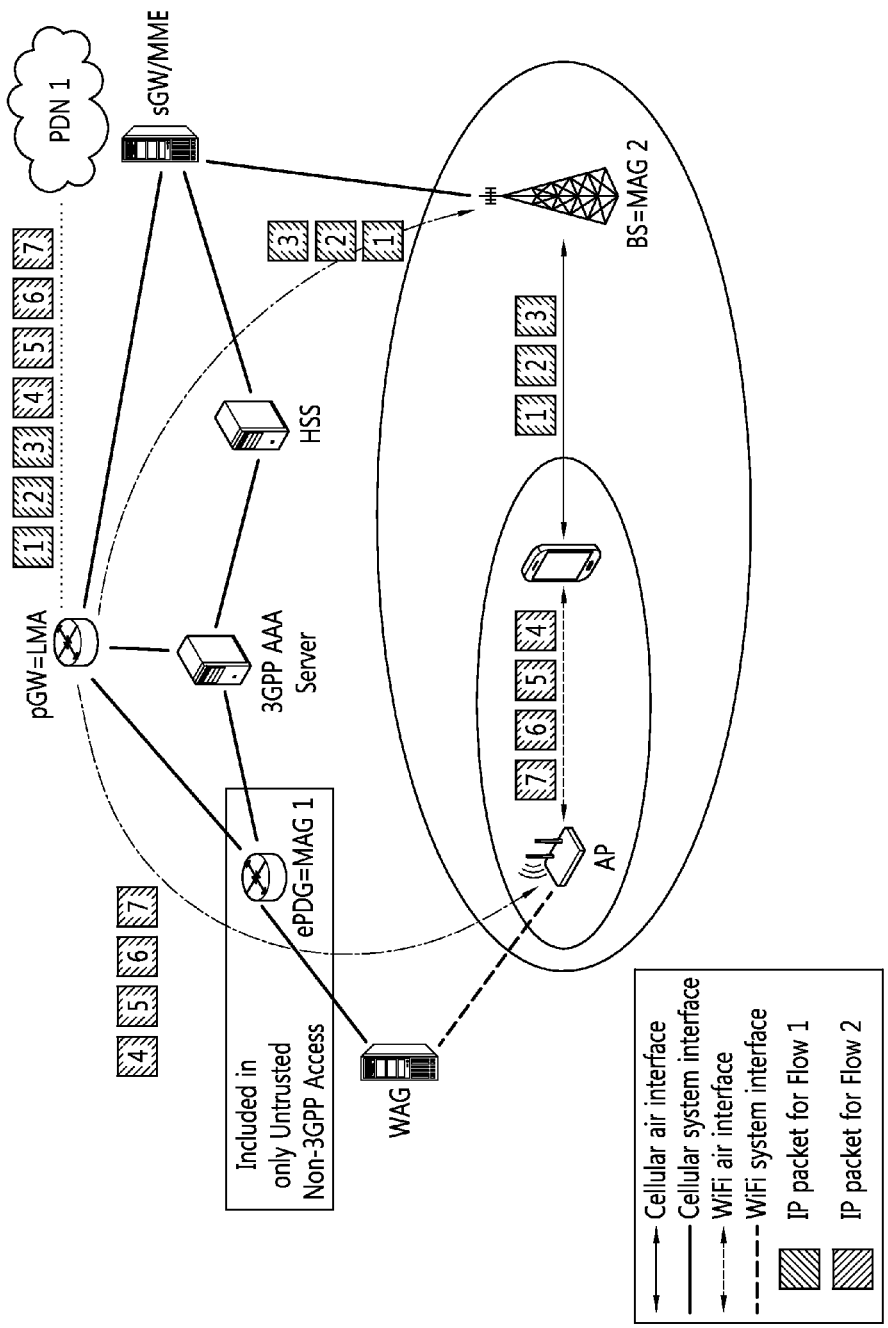
FIG. 7 shows another example of IP flow mobility in a converged communication system of a cellular system and a Wi-Fi system.

FIG. 7 shows another example of IP flow mobility in a converged communication system of a cellular system and a Wi-Fi system. FIG. 7 shows U-plane separation for different data flows, i.e., bandwidth/U-plane segregation.

Referring to FIG. 7, IP packets for flow 1 include IP packets 1, 2, and 3, and IP packets for flow 2 include IP packets 4, 5, 6, and 7. The P-GW is connected to a PDN 1, and operates as an LMA. That is, all IP packets are transmitted to a UE through the P-GW. The IP packets for flow 1 are transmitted to the UE through the cellular system by going through a BS. In this case, the BS may be an MAG in the cellular system. The IP packets for flow 2 are transmitted to the UE through the Wi-Fi system by going through the ePDG and/or the WAG. In this case, the ePDG or the WAG may be an MAG in the Wi-Fi system. That is, IP packets for different flows are segregated each other.

In scenarios for simultaneous transmission, a method for establishing, by a network, a session to support seamless connectivity for data flows may be required. Accordingly, according to an embodiment of the present invention, a method for establishing, under the control of a primary RAT system, a data flow session for the same PDN in the primary RAT system is described. In a following description, it is assumed that the primary RAT system is a 3GPP LTE system and the secondary RAT system is a Wi-Fi system, but the present invention is not limited thereto. In a following description, it is assumed that a mobility IP network protocol is a PMIP, but the present invention is not limited thereto. The present invention may be applied to other protocols, such as a dual stack mobile IP (DSMIP) protocol, GPRS tunneling protocol (GP), etc. In addition, in the secondary RAT system, it is assumed that a data flow session for the same PDN already exists.

A state of a UE in the primary RAT system may be one of the followings:

Evolved packet system (EPS) mobility management (EMM)-Deregistered+EPS connection management (ECM)-Idle (+RRC-Idle)

EPS-Registered+ECM-Idle (+RRC-Idle)

If multiple flows are mapped to one bearer and a specific flow is only determined to be routed, a routing type may be determined to be bandwidth aggregation. Also, in the LTE system, a UE and P-GW share traffic flow description information (e.g., source and destination IP address, port numbers, and protocol information) with each other as a traffic flow template within protocol configuration options. Therefore, the UE and P-GW attempt to route a specific flow only, the P-GW, by delivering the traffic flow description information, may inform the UE about which flow within the corresponding EPS bearer is routed.

Also, the present invention may be applied to route a PDN connection newly established or under establishment in a secondary RAT system in units of flows. While the PDN connection is established through the secondary RAT system, the P-GW may request resource allocation for the corresponding PDN connection, may configure QoS for the corresponding PDN connection, or may map the corresponding PDN connection to the existing resources. Since the corresponding PDN connection is a user data path established or delivered via the secondary RAT system rather than the primary RAT system, all of the procedures (e.g., radio bearer-related resource allocation, resource allocation between an eNB and S-GW, etc.) are not necessarily required to be performed. However, the fact that the corresponding PDN connection is established through the secondary RAT system has to be delivered to the S-GW or MME.

The following are resources and QoS parameters required for a PDN connection.

EPS bearer identifier (ID) (in a create session request sent by the MME, in a create bearer response sent by the MME)
QCI: QoS class identifier
ARP: allocation and retention priority
GBR (UL/DL): guaranteed bit rate
MBR: maximum bit rate
APN-AMBR: access point name—aggregate maximum bit rate
UE-AMBR In addition, if the state of a UE in the primary RAT system is EMM-Deregistered+ECM-Idle (+RRC-Idle), an identifier intended to identify the corresponding UE may be assigned together. Also, a preferred network (e.g., a LTE system or Wi-Fi system) for the corresponding PDN connection according to the subscription type of the corresponding UE may be provided.

The information about the corresponding PDN connection may be delivered not only to general devices but also to an entity of the LTE system such as an eNB, MME, and new entity. Or, the information about the corresponding PDN connection may be delivered to an entity of the LTE system only when resources are newly allocated.

A service provider cost reduction policy based on a user subscription type is described. A user may use a voice service on an hourly rate or without limitation according to a pricing model. Similarly, the user may use a messaging service such as a short message service (SMS) or multimedia message service (MMS) based on the number of messages or without limitation according to a pricing model. If a user who has subscribed to a pricing model for unlimited use attempts to use the voice and messaging service, it is more economical for a communication service provider to provide the corresponding service through the Wi-Fi system. Also, the communication service provider may offer a pricing model utilizing the Wi-Fi system to the users who have subscribed to usage-based pricing model, namely, pricing in proportion to hours of use or the number of uses. For example, if the hours of use or the number of uses by the user exceeds a predetermined limit according to a specific pricing model, the communication service provider may provide the corresponding service through the Wi-Fi system.

Figure 8:
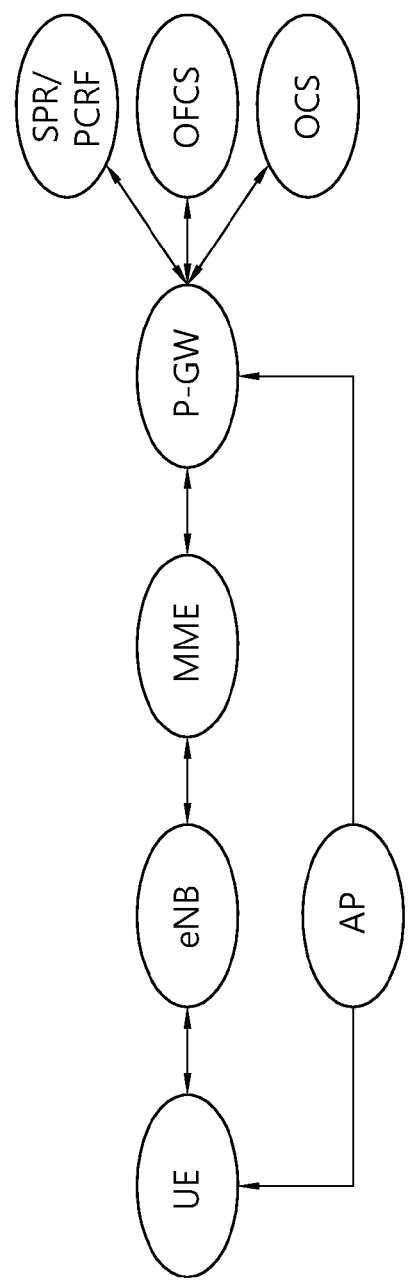
FIG. 8 shows an example of a service provider cost reduction policy using user subscription information.

FIG. 8 shows an example of a service provider cost reduction policy using user subscription information. A communication service provider may manage user subscription information by using a subscriber profile repository (SPR), offline charging system (OFCS), online charging system (OCS), etc. The SPR may manage information such as allowed services and allowed QoS. The OFCS may manage information such as accounting data (the amount of traffic, connection time, etc) for each UE. The OCS may manage the remaining usage for each UE. Information for operations required by the communication service provider according to the user subscription information may be delivered to each entity. In other words, the communication service provider may deliver its preferred network type (e.g., LTE system or Wi-Fi system) for each service to each entity such as UE, eNB, and MME. The information for the operations required by the communication service provider according to the user subscription information may be delivered during a PDN connection (bearer) establishment/modification process or U-plane separation request/response process. The delivered information may be used as a criterion by which appropriateness of the U-plane separation is determined.

First, a method for establishing a data flow session of the LTE system additionally according to a trigger of the network in case a data flow session of the Wi-Fi system has been already established is described. To this end, a method for setting up a measurement configuration for the Wi-Fi system and a method for reporting measurement results are described first.

The entity of the LTE system such as an eNB, MME, and P-GW may set up a measurement configuration for the Wi-Fi system to a general device supposed to enter the ECM-Idle+RRC-Idle state. In this case, a target device to which the measurement configuration is applied may be limited to those devices communicating all of U-plane data through the Wi-Fi system. In other words, the target device to which the measurement configuration is applied may correspond to such a general device, all of the bearers of which are deactivated.

The measurement configuration may be indicated to the general device according to the methods described below.

1) Notify whether to report measurement results even in the RRC-Idle state when the measurement configuration is set up in the RRC-Connected state.

2) Set up the measurement configuration when the corresponding device switches to the RRC-Idle state.

3) Set up the measurement configuration in a broadcast manner.

The method 1) and 2) may override the method 3). Also, the method 3) may be limited to general devices in the EMM-Deregistered state.

A measurement report may be transmitted periodically or in an event-triggered manner. The period or event in the measurement report may be predefined or may be set the same as the time point at which the existing procedure related to an idle mode mobility (e.g., normal/periodic tracking area update (TAU)) is performed. Or, the period or event may be defined dynamically by the entity of the LTE system. The measurement report set-up may be limited only to general devices in the EMM-Registered+ECM-Idle+RRC-Idle state.

Figure 9:
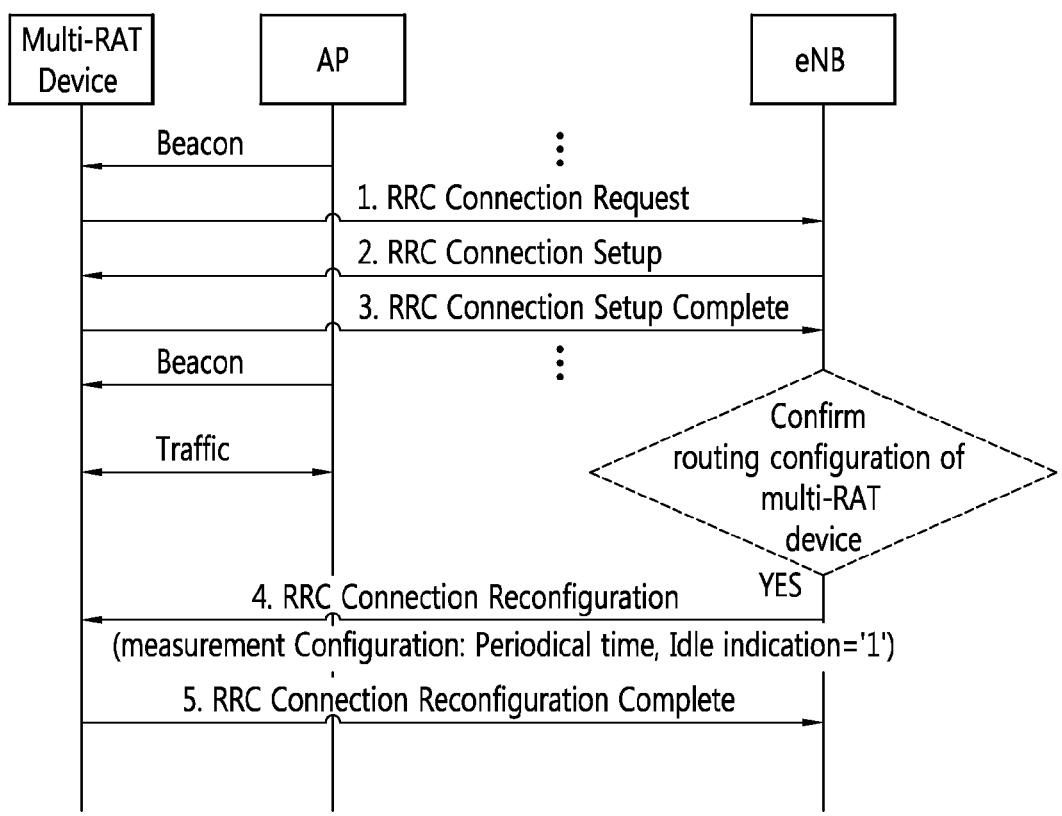
FIG. 9 shows an example of a method for setting up a measurement configuration according to an embodiment of the present invention.

FIG. 9 shows an example of a method for setting up a measurement configuration according to an embodiment of the present invention. The example of FIG. 9 corresponds to a case where the eNB triggers setting up measurement configuration for the Wi-Fi system. The eNB is aware that the corresponding multi-RAT device transmits and receives all of the U-plane data through the Wi-Fi system.

Referring to FIG. 9, the eNB checks a routing configuration of the multi-RAT device. If the routing type is U-plane switch and the transmission RAT system is the Wi-Fi system, the eNB transmits an RRC connection reconfiguration message to the multi-RAT device and sets up the measurement configuration. The measurement configuration may be indicated by the aforementioned method 1). In other words, while setting up the measurement configuration to the multi-RAT device in the RRC-Connected state, the eNB may inform about whether to report measurement results even in the RRC-Idle state. For example, a value of "Idle indication field" within the RRC connection reconfiguration message may be set to 1. The "Idle indication field" set to value of 1 may indicate that measurement results have to be reported even in the RRC-Idle state.

Figure 10:
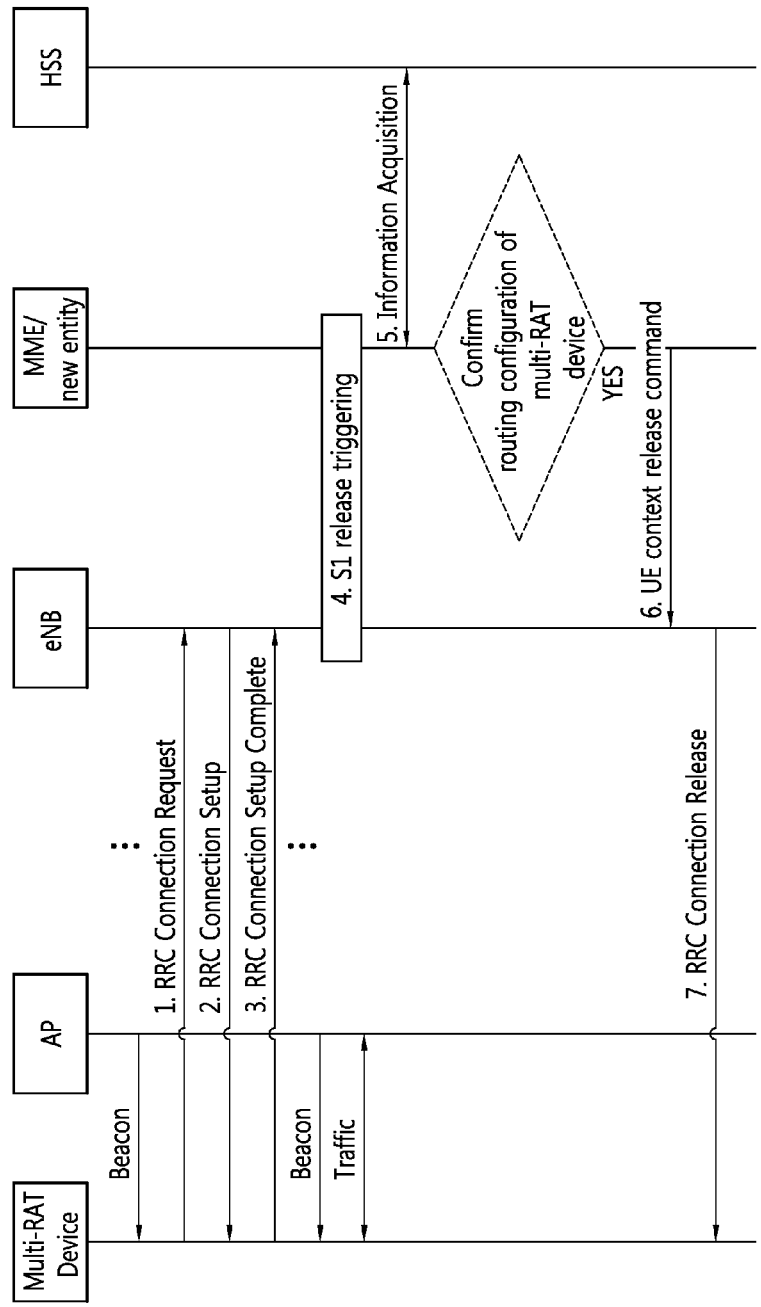
FIG. 10 shows an example of a method for setting up a measurement configuration according to another embodiment of the present invention.

FIG. 10 shows an example of a method for setting up a measurement configuration according to another embodiment of the present invention. The example of FIG. 10 corresponds to a case where the MME or new entity of the LTE system triggers setting up measurement configuration for the Wi-Fi system. The MME or new entity is aware that the corresponding multi-RAT device transmits and receives all of the U-plane data through the Wi-Fi system.

Referring to FIG. 10, the MME or new entity may trigger S1 release and may exchange information with the HSS. The MME or new entity checks the routing configuration of the multi-RAT device based on the information exchanged with the HSS. If the routing type is U-plane switch and the transmission RAT system is the Wi-Fi system, the MME or new entity may transmit a UE context release command message to the eNB and may set up the measurement configuration. The measurement configuration can be indicated by the aforementioned method 2). In other words, the measurement configuration may be set up when the multi-RAT device switches to the RRC-Idle state. The measurement configuration may use the existing S1-related message such as the UE context release command message or may use a newly defined message. The eNB may transmit an RRC connection release message to the multi-RAT device and may deliver the measurement configuration received from the MME or new entity to the multi-RAT device.

Figure 11:
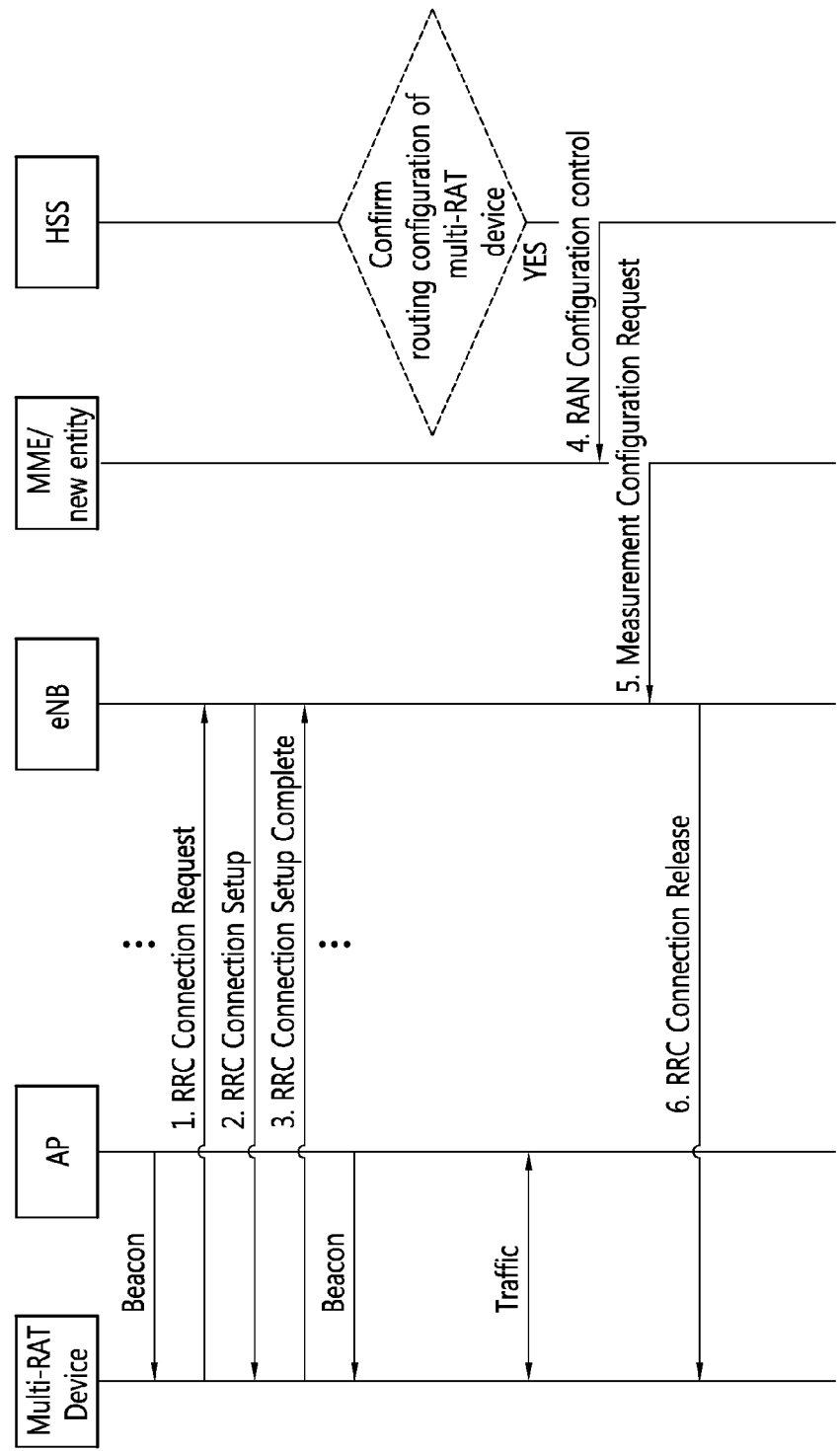
FIG. 11 shows an example of a method for setting up a measurement configuration according to another embodiment of the present invention.

FIG. 11 shows an example of a method for setting up a measurement configuration according to another embodiment of the present invention. The example of FIG. 11 corresponds to a case where the P-GW triggers setting up measurement configuration for the Wi-Fi system. The P-GW is aware that the corresponding multi-RAT device transmits and receives all of the U-plane data through the Wi-Fi system. For example, only the P-GW may be aware that the multi-RAT device is connected to the Wi-Fi system.

Referring to FIG. 11, the P-GW checks the routing configuration of the multi-RAT device. If the routing type is U-plane switch and the transmission RAT system is the Wi-Fi system, the P-GW may transmit a radio access network (RAN) configuration control message to the MME or new entity, and may set up the measurement configuration. The measurement configuration may be indicated by the aforementioned method 2). In other words, the measurement configuration may be set up when the multi-RAT device switches to the RRC-Idle state. The MME or new entity may transmit a measurement configuration request message to the eNB and may deliver the measurement configuration received from the P-GW to the eNB. The eNB may transmit an RRC connection release message to the multi-RAT device and may deliver the measurement configuration received from the MME or new entity to the multi-RAT device.

A general device may report a measurement result such as signal strength of the Wi-Fi system. The general device may report the measurement result according to the measurement configuration set up by the LTE system or according to the general device's own decision.

Figure 12:
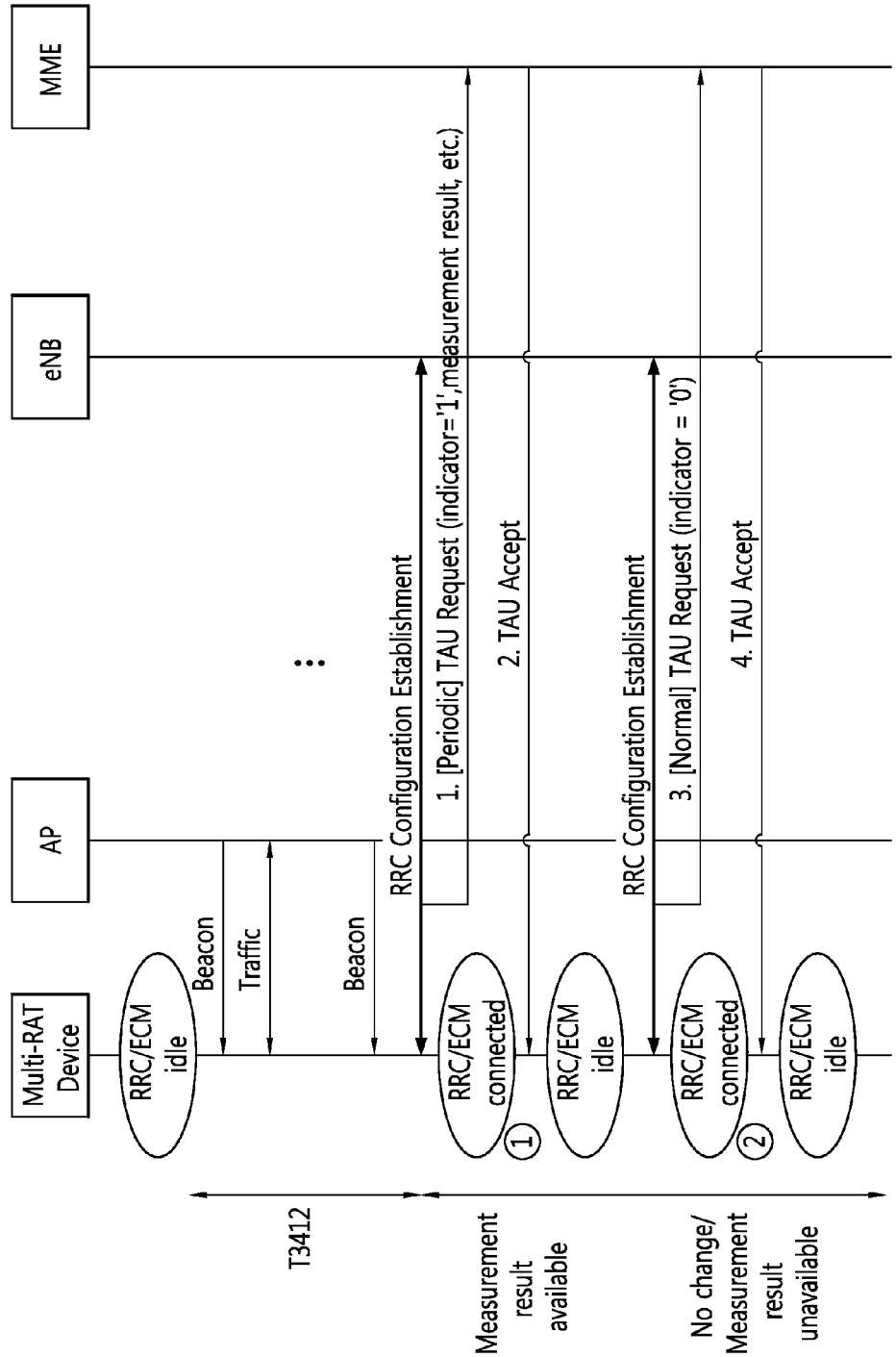
FIG. 12 shows an example of a method for reporting measurement results according to an embodiment of the present invention.

FIG. 12 shows an example of a method for reporting measurement results according to an embodiment of the present invention.

Referring to FIG. 12, when it is possible to transmit a measurement result, the multi-RAT device may transmit the measurement result to the MME by incorporating the measurement result into the existing message related to idle mode mobility such as a TAU request message. If a value of a specific indicator within the TAU request message is 1, the TAU request message may include the measurement result.

The MME may store the received measurement result into the HSS and may also deliver the received measurement result to different entities of the LTE system such as a different eNB, P-GW, and new entity. Afterwards, if there is no change in the measurement result or it is not possible to transmit the measurement result, the multi-RAT device may transmit a normal TAU request message to the MME.

Figure 13:
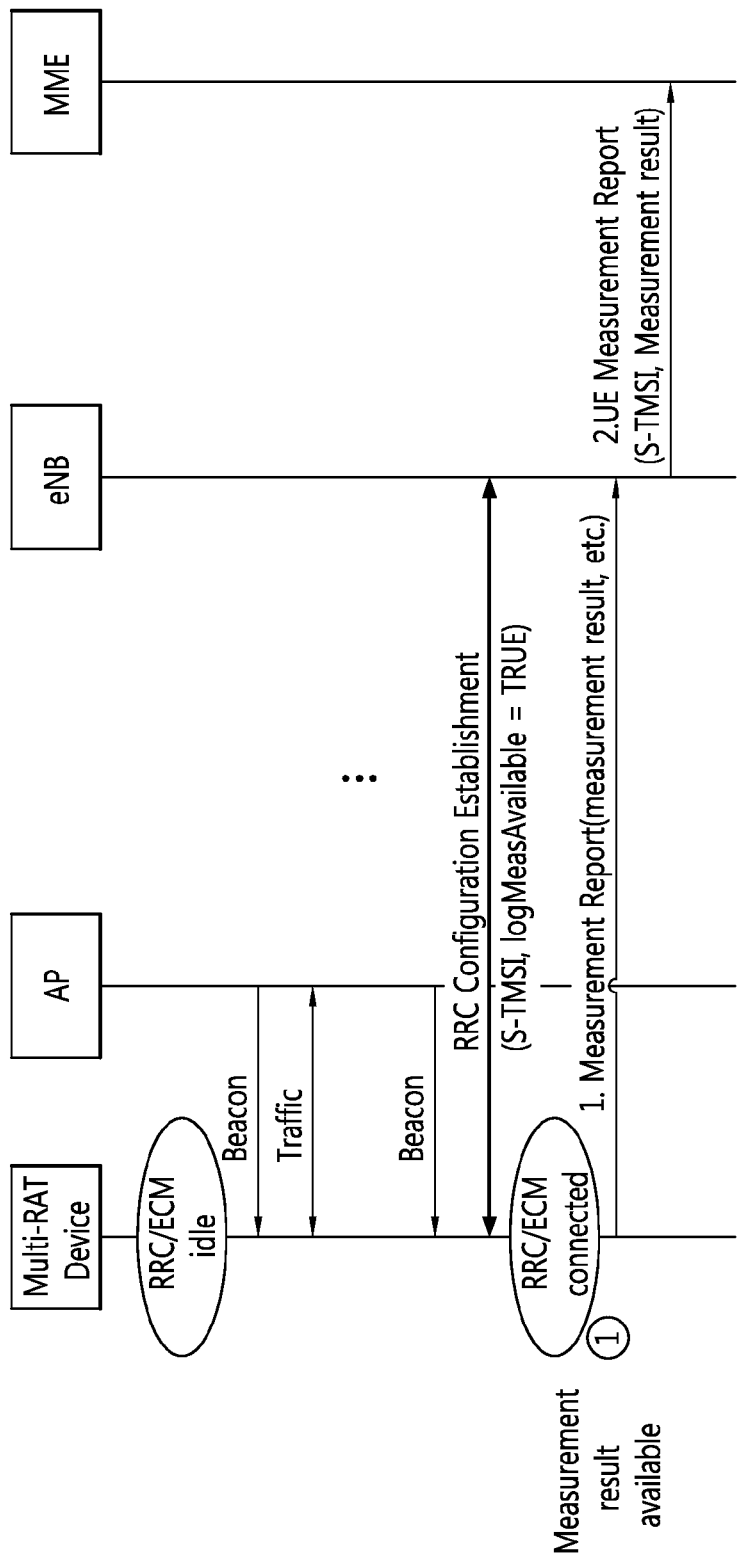
FIG. 13 shows an example of a method for reporting measurement results according to another embodiment of the present invention.

FIG. 13 shows an example of a method for reporting measurement results according to another embodiment of the present invention.

Referring to FIG. 13, when it is possible to transmit a measurement result, the multi-RAT device may transmit the measurement result to the eNB by incorporating the measurement result into the existing RRC message such as a connection request message, connection setup complete message, or measurement report message. The example of FIG. 13 shows the case of using the measurement report message. In order to make the eNB, supposed to receive the measurement result, identify the multi-RAT device, the multi-RAT device may use system architecture evolution (SAE) temporary mobile subscriber identity (S-TMSI) provided by a non-access stratum (NAS) layer or may use an identifier assigned to the corresponding multi-RAT device while a PDN connection is established through the Wi-Fi system. The eNB may store the received measurement result into the HSS by using a UE measurement report through the MME and may also deliver the received measurement result to different entities of the LTE system such as a different eNB, P-GW, and new entity.

Figure 14:
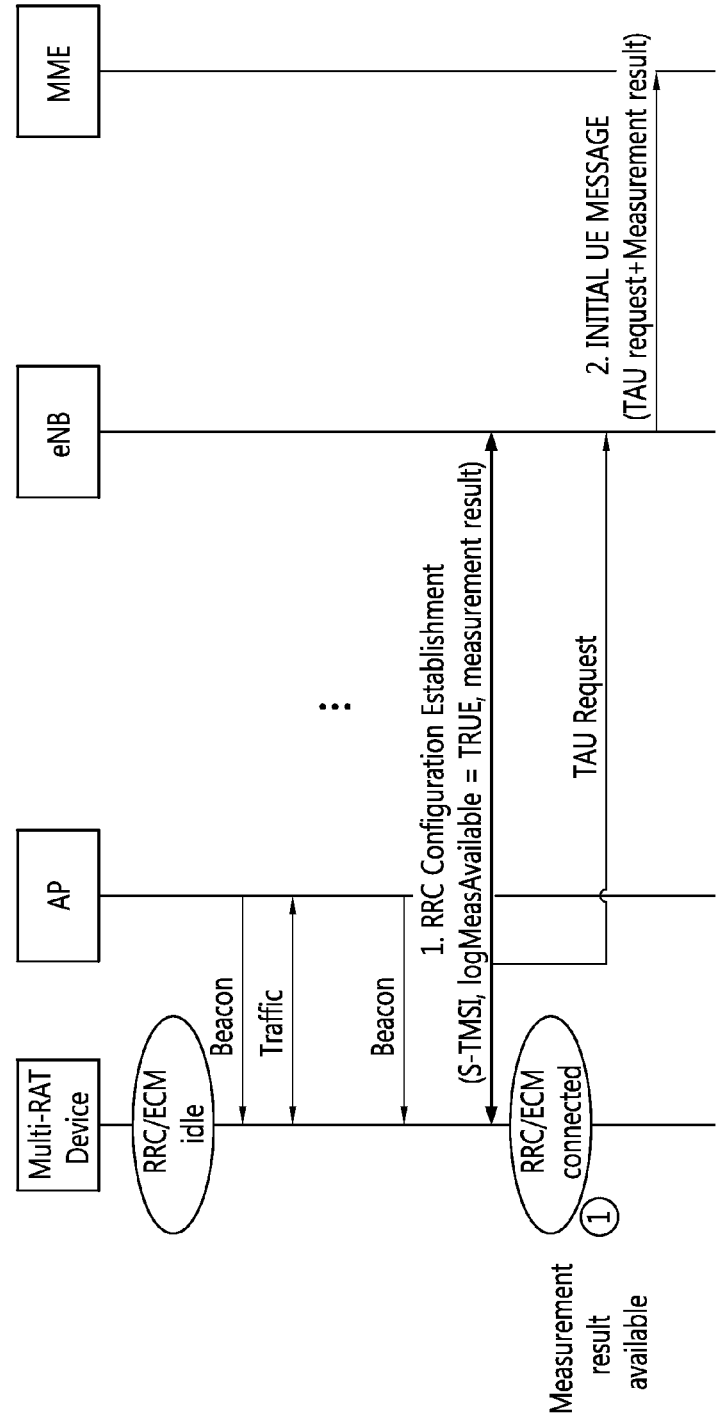
FIG. 14 shows an example of a method for reporting measurement results according to another embodiment of the present invention.

FIG. 14 shows an example of a method for reporting measurement results according to another embodiment of the present invention.

Referring to FIG. 14, when it is possible to transmit a measurement result, the multi-RAT device may transmit the measurement result to the eNB by incorporating the measurement result into a connection setup complete message. In order to make the eNB, supposed to receive the measurement result, identify the multi-RAT device, the multi-RAT device may use the S-TMSI provided by the NAS layer or may use an identifier assigned to the corresponding multi-RAT device while a PDN connection is established through the Wi-Fi system.

Also, in order to indicate whether the measurement result for the Wi-Fi system is included or not, the multi-RAT device may set a value of logMeasAvailable parameter within the connection setup complete message or a value of a newly defined parameter to "true". The "true" value may indicate that the connection setup complete message actually includes the measurement result or may indicate that the multi-RAT device only holds the measurement result. Therefore, upon receiving the connection setup complete message in which the logMeasAvailable parameter is set to "true", the eNB may allocate to the corresponding multi-RAT device physical resources used to transmit the corresponding measurement result. In this case, a message actually carrying the measurement result may be a measurement report message. When the connection request message is used, the spare bit within the connection request message may be used as the logMeasAvailable parameter.

The eNB may store the received measurement result into the HSS by using an initial UE message through the MME and may also deliver the received measurement result to different entities of the LTE system such as a different eNB, P-GW, and new entity.

Also, if it is possible to transmit the measurement result, the multi-RAT device may transmit the measurement result to the eNB by incorporating the measurement result into a newly defined RRC message such as a secondary RAT measurement report message.

The entity of the LTE system such as an eNB, MME, and new entity may determine whether to establish a data flow session for a PDN operated in the Wi-Fi system based on the reported measurement result. In other words, the entity of the LTE system, based on the reported measurement result, may determine which routing type (i.e., U-plane aggregation/U-plane segregation/U-plane switch) is appropriate for data flows transmitted and received through the Wi-Fi system.

A method for establishing a session of the LTE system additionally according to a trigger of the network of the LTE system is described.

Figure 15:
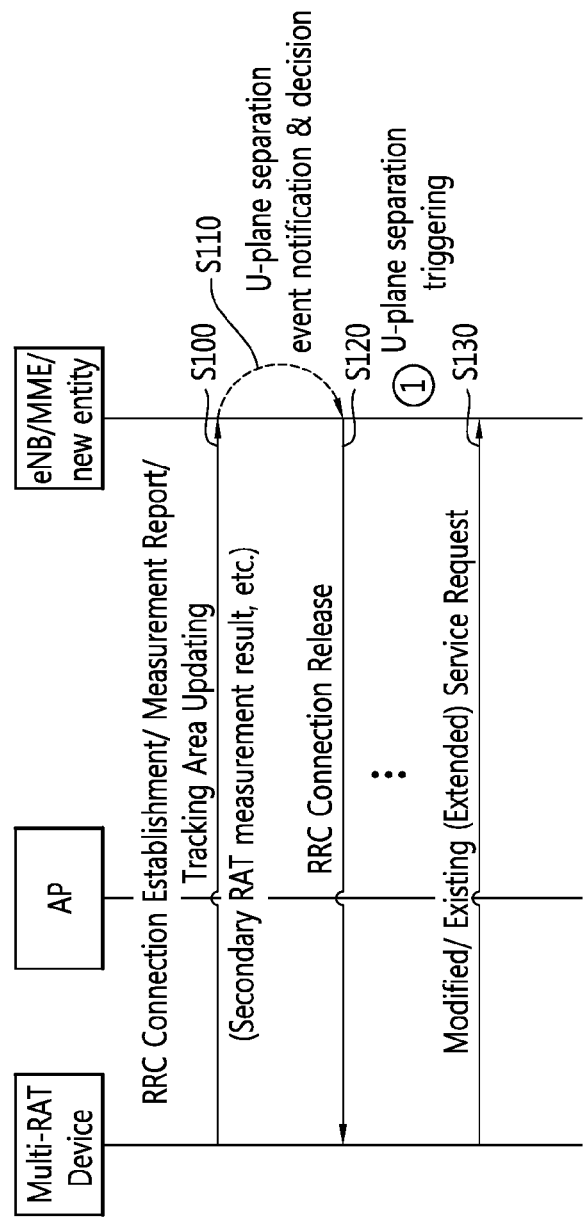
FIG. 15 shows an example of a method for establishing a session of a LTE system by a trigger of a network according to an embodiment of the present invention.

FIG. 15 shows an example of a method for establishing a session of a LTE system by a trigger of a network according to an embodiment of the present invention.

In step S100, the multi-RAT device transmits the measurement result to the entity of the LTE system such as the eNB, MME, and new entity by using the aforementioned method for reporting a measurement result.

In step S110, if the eNB determines U-plane separation to be appropriate based on the measurement result reported by the multi-RAT device, the eNB informs the MME and new entity about the determination. The entity of the LTE system determines appropriateness of U-plane separation by taking account of U-plane separation event of the eNB, measurement result, QoS of each bearer held by the corresponding multi-RAT device and air/network load of each RAT system, etc. The QoS may include a quality class identifier (QCI), allocation and retention priority (ARP), bit rate or traffic per bearer, and bit rates of traffic per group of bearers, etc.

In step S120, the eNB transmits the RRC connection release message to the corresponding multi-RAT device. Accordingly, the U-plane separation may be triggered.

In step S130, the multi-RAT device holding a U-plane determined to be appropriate for U-plane separation transmits a modified/existing (extended) service request message or attach message to the entity of the LTE system. Upon receiving the message, the entity of the LTE system may perform a session establishment procedure to apply U-plane separation. Also, the entity of the LTE system may re-confirm the appropriateness of U-plane separation.

Figure 16:
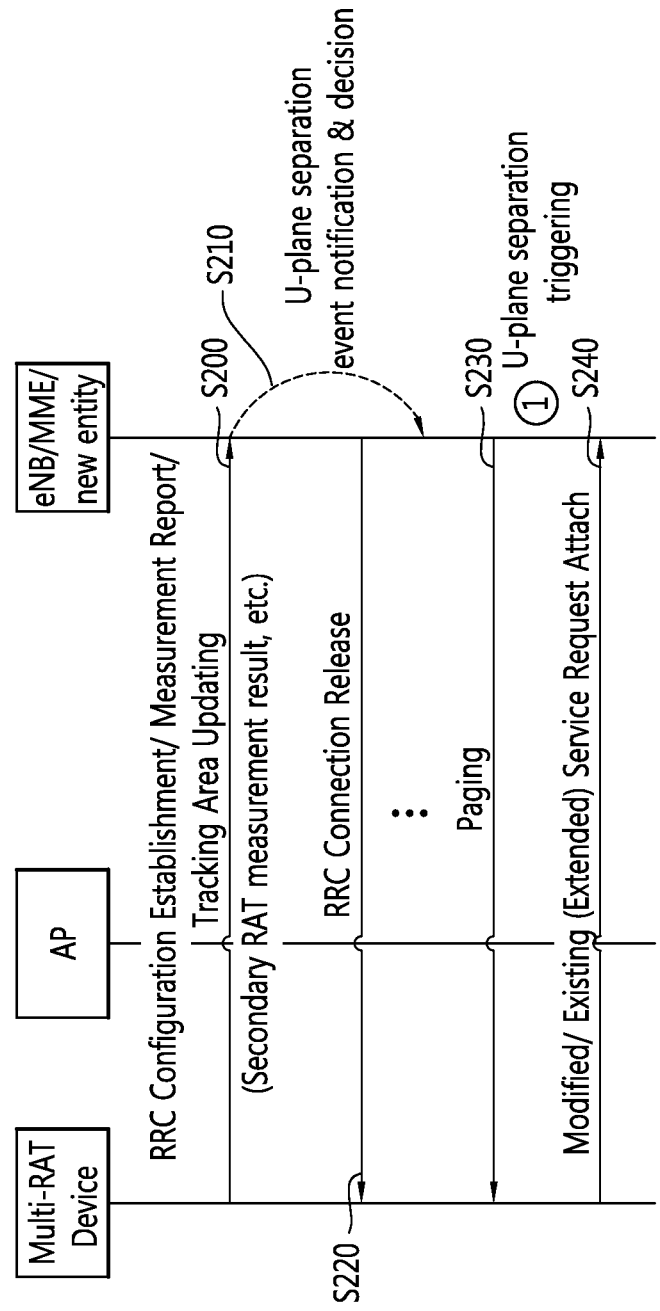
FIG. 16 shows an example of a method for establishing a session of a LTE system by a trigger of a network according to another embodiment of the present invention.

FIG. 16 shows an example of a method for establishing a session of a LTE system by a trigger of a network according to another embodiment of the present invention.

Step S200 to S220 are the same respectively as step S100 to S120 of FIG. 15. Therefore, descriptions are omitted. In step S230, if the entity of the LTE system determines U-plane separation to be appropriate, the entity of the LTE system transmits a paging to the multi-RAT device. Accordingly, U-plane separation may be triggered. Step S240 is the same as step S130 of FIG. 15. Therefore, description is omitted.

Figure 17:
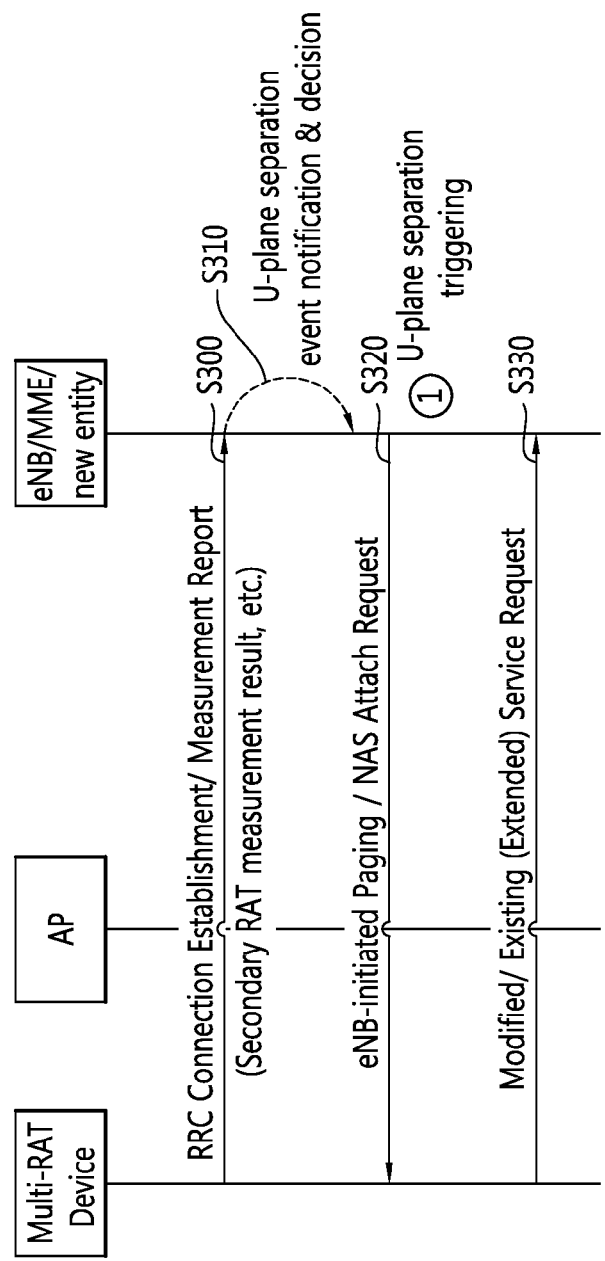
FIG. 17 shows an example of a method for establishing a session of a LTE system by a trigger of a network according to another embodiment of the present invention.

FIG. 17 shows an example of a method for establishing a session of a LTE system by a trigger of a network according to another embodiment of the present invention.

Step S300 to S310 are the same respectively as step S100 to S110 of FIG. 15. Therefore, descriptions are omitted. In step S320, if the entity of the LTE system determines U-plane separation to be appropriate, the entity of the LTE system transmits a paging or NAS attach request message to the multi-RAT device. Since the multi-RAT device is in the RRC-Connected state, the NAS attach request message may be transmitted in a unicast form. Accordingly, U-plane separation may be triggered. Step S330 is the same as step S130 of FIG. 15. Therefore, description is omitted.

Figure 18:
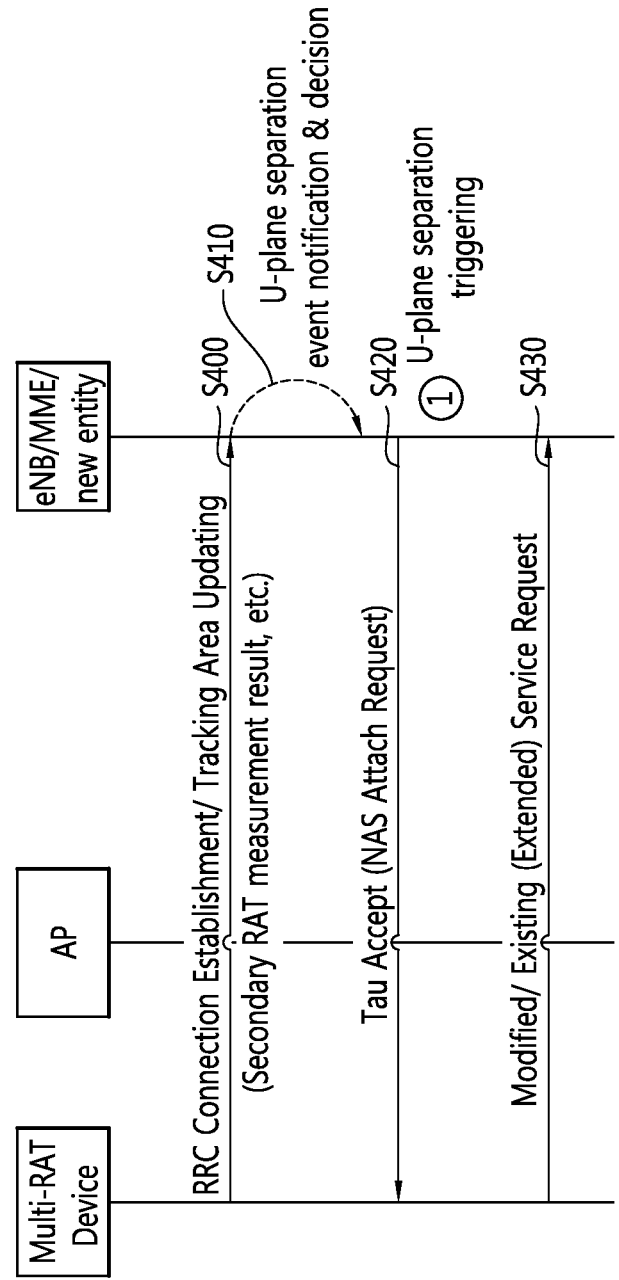
FIG. 18 shows an example of a method for establishing a session of a LTE system by a trigger of a network according to another embodiment of the present invention.

FIG. 18 shows an example of a method for establishing a session of a LTE system by a trigger of a network according to another embodiment of the present invention.

Step S400 to S410 are the same respectively as step S100 to S110 of FIG. 15. Therefore, descriptions are omitted. In step S420, the entity of the LTE system may request a NAS attach by transmitting a TAU accept message to the multi-RAT device. At this time, the existing TAU procedure within a core network may be skipped. Accordingly, U-plane separation may be triggered. Step S430 is the same as step S130 of FIG. 15. Therefore, description is omitted.

A method for establishing a data flow session of the LTE system additionally according to a trigger of the general device in case a data flow session of the Wi-Fi system has been already established is described.

Figure 19:
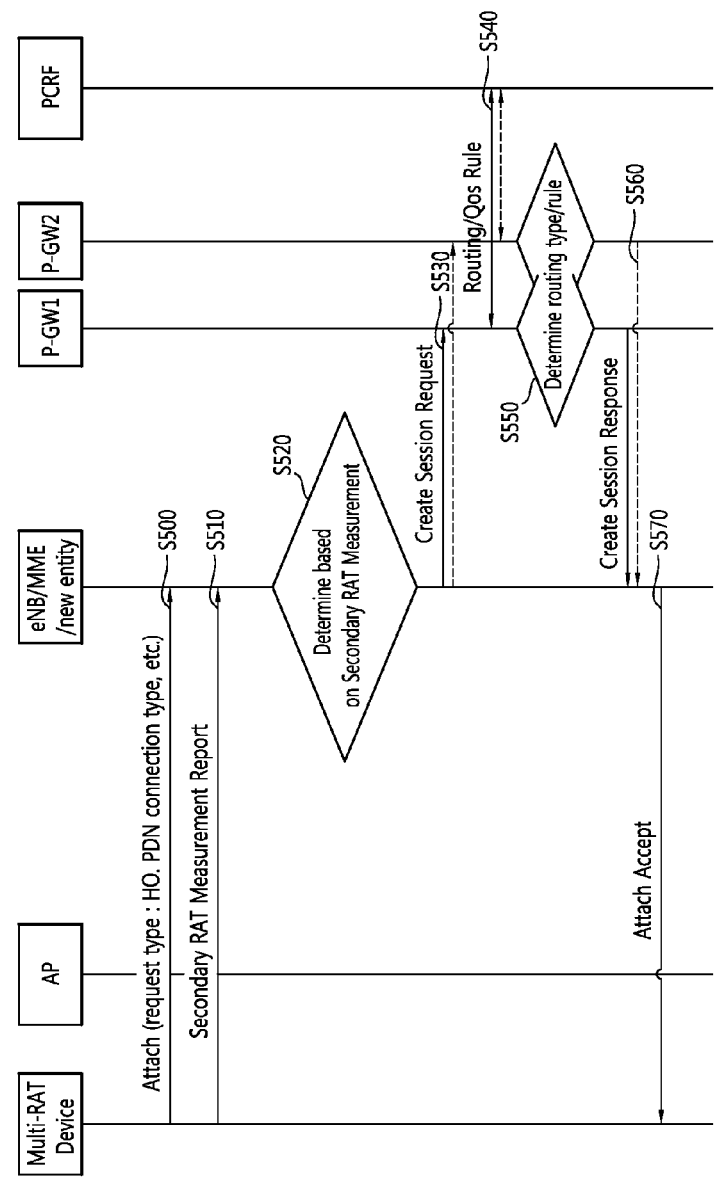
FIG. 19 shows an example of a method for establishing a session of a LTE system by a trigger of a general device according to an embodiment of the present invention.

FIG. 19 shows an example of a method for establishing a session of a LTE system by a trigger of a general device according to an embodiment of the present invention.

In step S500, the multi-RAT device performs RRC connection establishment and attach procedure with the entity of the LTE system such as an eNB, MME, and new entity. At this time, the following parameters may be delivered together.

Request type (EPS type): since a data flow session for the same PDN is already present in the Wi-Fi system, the request type is set to handover. The request type may be added as a form of a field within an RRC connection establishment message, or a value for the corresponding purpose may be newly defined within the existing establishment cause.

PDN connection HO type: this represents a method for processing a data flow session of the Wi-Fi system. For example, a value of Ob00 may indicate a request for handover (i.e., U-plane switch) of all of the data flows to the LTE system. A value of Ob01 may indicate a request for applying of bandwidth/U-plane aggregation during simultaneous transmission of data flows. A value of Ob10 may indicate a request for applying of bandwidth/U-plane segregation during simultaneous transmission of data flows. The value of Ob11 may indicate processing of a data flow session according to a decision of the network.

UE identifier

IP address/flow ID/EPS bearer ID: this represents an IP address/flow ID/EPS bearer ID assigned by the P-GW which has established a session through the Wi-Fi system.

Request routing type for each IP address/flow/EPS bearer: this may be either bandwidth/U-plane aggregation or bandwidth/U-plane segregation.

Request routing rule for each IP address/flow/EPS bearer: if the routing type is bandwidth/U-plane aggregation, this may represent a transmission ratio through each RAT system. If the routing type is bandwidth/U-plane segregation, this may represent a transmission RAT system.

Measurement result on an associated AP: measurement result of signal strength of an associated AP In step S510, the multi-RAT device transmits a secondary RAT measurement report message to an entity of the LTE system. Accordingly, the multi-RAT device may report associated APs and a measurement result on the associated APs. At this time, an existing message of the LTE system such as the RRC connection reconfiguration message and UE measurement report message may be used. For example, the type of measurement field within the UE measurement report message may be set to "inter-RAT", and the measurement report triggering field within the UE measurement report message may be set to "Inter-RAT neighbor becomes better than threshold".

If the value of the PDN connection HO type within the message received in step S500 is Ob00, the entity of the LTE system establishes a session with an S-GW or P-GW the same as a conventional method and releases the session of the Wi-Fi system.

If the value of the PDN connection HO type within the message received in step S500 is different from Ob00, in step S520, the entity of the LTE system determines which PDN is appropriate for simultaneous transmission based on request routing type/rule transmitted by the multi-RAT device, measurement result, air/network load of each RAT system, and QoS of each bearer. The QoS may include QCI, ARP, bit rate of traffic per bearer, and bit rates of traffic per group of bearers.

In step S530, the entity of the LTE system transmits a create session request message to the P-GW corresponding to the PDN determined to be appropriate for simultaneous transmission. The entity of the LTE system may use the information recorded in an HSS such as the P-GW to which the entity is connected. The create session request message may include an IP address/flow ID/EPS bearer ID appropriate for simultaneous transmission, and routing type/rule for each EPS bearer/flow. Also, the create session request message may include all of the routing rules for each routing type. The create session request message may be used for the P-GW to finally determine one routing type/rule.

In step S540, the P-GW may acquire routing type/rule from the PCRF.

In step S550, based on the routing type/rule acquired from the entity of the LTE system and/or PCRF, the P-GW determines whether to apply simultaneous transmission for the corresponding bearer/flow and routing type/rule.

In step S560, the P-GW applies the determined routing type/rule and notifies the entity of the LTE system of the application by transmitting a create session response message to the entity. The create session response message may include information for simultaneous transmission, such as an ID of EPS bearer to which simultaneous transmission has been applied, ID of a flow to which simultaneous transmission has been applied, and routing type/rule applied for each EPS bearer/flow. If the create session response message does not include the information for simultaneous transmission, it may indicate that simultaneous transmission is not applied to the created EPS bearer.

In step S570, if the create session response message includes information for simultaneous transmission, the entity of the LTE system stores information for simultaneous transmission in the HSS, for example. And the entity of the LTE system transmits information for simultaneous transmission to the multi-RAT device through an attach accept message or RRC connection reconfiguration message. The entity of the LTE system may transmit a different ID (for example, E-UTRAN radio access bearer (E-RAB) ID, DRB ID, logical channel ID (LCID)) mapped to the corresponding EPS bearer ID additionally or may transmit the different ID by replacing the corresponding EPS bearer ID. Meanwhile, if the create session response message does not include information for simultaneous transmission, the entity of the LTE system may transmit the existing attach accept message to the multi-RAT device.

Upon receiving the information for simultaneous transmission, the multi-RAT device may perform the operation (data transmission) according to the corresponding routing type/rule. Also, if the routing type is bandwidth/U-plane segregation and there is no more data to transmit through a session of the Wi-Fi system mapped to the corresponding EPS bearer, the P-GW or entity of the LTE system may release or deactivate the session of the Wi-Fi system mapped to the corresponding EPS bearer.

Figure 20:
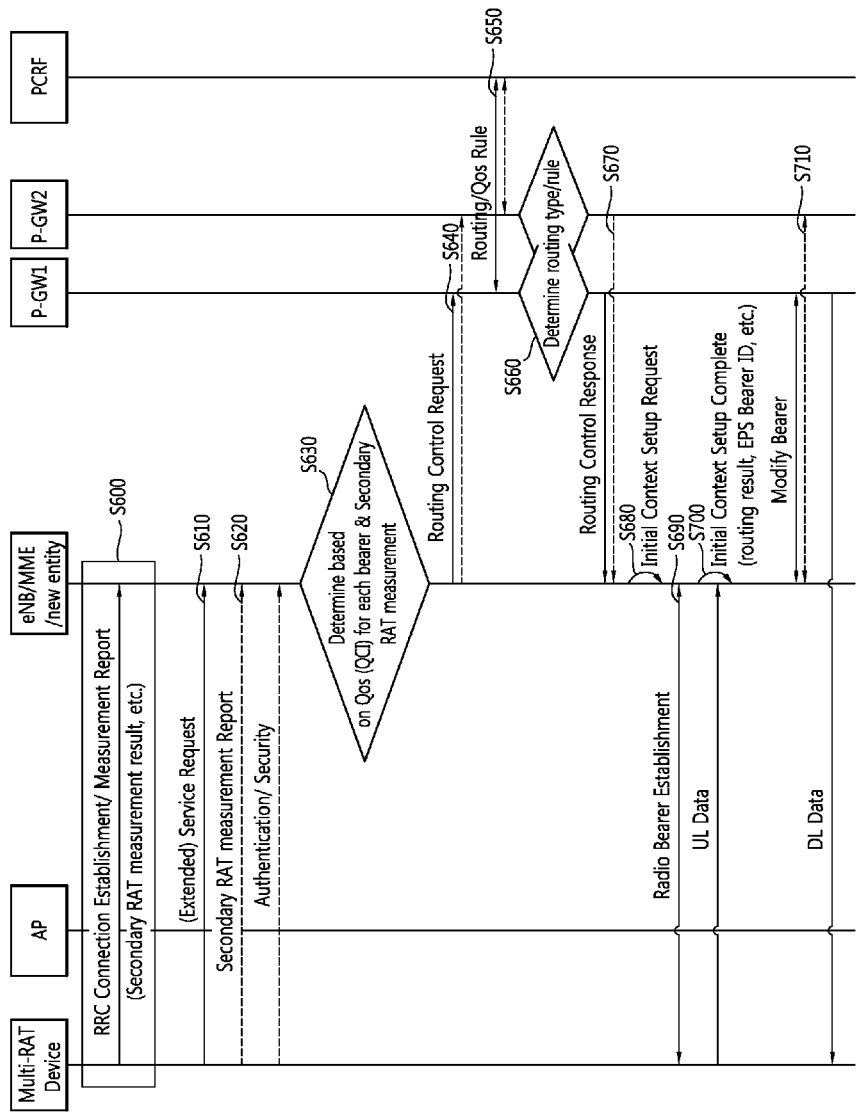
FIG. 20 shows an example of a method for establishing a session of a LTE system by a trigger of a general device according to another embodiment of the present invention.

FIG. 20 shows an example of a method for establishing a session of a LTE system by a trigger of a general device according to another embodiment of the present invention.

In step S600, if the method for setting up the measurement configuration for the Wi-Fi system and the method for reporting the measurement result described in FIGS. 9 to 14 above are applied, the multi-RAT device may transmit a RRC connection establishment message and measurement report message to the entity of the LTE system such as an eNB, MME, and new entity.

In step S610, the multi-RAT device transmits a (extended) service request message to the entity of the LTE system. Accordingly, the multi-RAT device may request the entity of the LTE system to perform handover of one or more data flows transmitted and received through the Wi-Fi system.

The service request message may include service type of a data flow in the Wi-Fi system and bearer information. The service type and bearer information may be transmitted through the following methods.

1) The service type and bearer information may be transmitted by using a reserved value of a service type field in a service request message.

Table 2 represents the service type field of the existing service request message.

TABLE 2

| Bit 4 | Bit 3 | Bit 2 | Bit 1 | Description |
|---|---|---|---|---|
| 0 | 0 | 0 | 0 | mobile originating CS fallback or 1xCS fallback |
| 0 | 0 | 0 | 1 | mobile terminating CS fallback or 1xCS fallback |
| 0 | 0 | 1 | 0 | mobile originating CS fallback emergency call or 1xCS fallback emergency call |
| 0 | 0 | 1 | 1 | unused; shall be interpreted as "mobile originating CS fallback or 1xCS fallback", if received by the network |
| 0 | 1 | 0 | 0 | unused; shall be interpreted as "mobile originating CS fallback or 1xCS fallback", if received by the network |
| 1 | 0 | 0 | 0 | packet services via S1 |
| 1 | 0 | 0 | 1 | unused; shall be interpreted as "packet services via S1", if received by the network |
| 1 | 0 | 1 | 0 | unused; shall be interpreted as "packet services via S1", if received by the network |
| 1 | 0 | 1 | 1 | unused; shall be interpreted as "packet services via S1", if received by the network |

The service type and bearer information may be transmitted by using reserved values not shown in Table 2. For example, reserved values may be used as follows.

Ob1100: Handover for all PDN connection (U-plane switch)
Ob1101: Bandwidth/U-plane aggregation for the specific PDN connection
Ob1110: Bandwidth/U-plane segregation for the specific PDN connection
Ob1111: Handover with no preference/decision by network→this value may be replaced with the existing packets services via S1.

2) The service type and bearer information may be transmitted by using the EPS bearer context status field of the service request message.

For example, the multi-RAT device may set all of the bits to 1, which correspond to the EPS bearers transmitted and received through a current Wi-Fi system. At this time, each bit is mapped to EPS bearer ID. Similarly, the multi-RAT device may set only those bits to 1, which correspond to specific EPS bearers requesting application of U-plane separation among the EPS bearers transmitted and received through the Wi-Fi system. In other cases, the multi-RAT device may set only those bits to 1, which correspond to specific EPS bearers intending to apply the value specified by the service type among the EPS bearers transmitted and received through the Wi-Fi system. Table 3 shows an example of EPS bearer context status field of the service request message.

TABLE 3

| 8 | 7 | 6 | 5 | 4 | 3 | 2 | 1 |
|---|---|---|---|---|---|---|---|
| EPS bearer context status IEI | | | | | | | |
| Length of EPS bearer context status contents | | | | | | | |
| EBI (7) | EBI (6) | EBI (5) | EBI (4) | EBI (3) | EBI (2) | EBI (1) | EBI (0) |
| EBI (15) | EBI (14) | EBI (13) | EBI (12) | EBI (11) | EBI (10) | EBI (9) | EBI (8) |

3) The service type and bearer information may be transmitted by being included as a form of a field within an RRC connection establishment message, or a value for the corresponding purpose may be newly defined within the existing establishment cause.

Step of S620 is the same as step S510 of FIG. 19. Therefore, descriptions is omitted.

If the request type within the message received in step of S610 is U-plane switch (e.g., Ob1100), the entity of the LTE system establishes a session with the S-GW or P-GW the same as a conventional method and releases a session of the Wi-Fi system.

If the request type in the message received in step of S610 has a value other than Ob1100, in step S630, the entity of the LTE system determines routing type/rule and which PDN is appropriate for simultaneous transmission based on a measurement result, air/network load of each RAT system, and QoS of each bearer. The QoS may include QCI, ARP, bit rate of traffic per bearer, and bit rates of traffic per group of bearers. The routing rule may be either one of bandwidth/U-plane aggregation or bandwidth/U-plane segregation. If the routing type is bandwidth/U-plane aggregation, the routing rule may indicate a transmission ratio of each RAT system. If the routing type is bandwidth/U-plane segregation, the routing rule may indicate a transmission RAT system.

In step S640, the entity of the LTE system transmits a routing control request message to the P-GW corresponding to the PDN determined to be appropriate for simultaneous transmission. The entity of the LTE system may use the information recorded in an HSS such as the P-GW to which the entity is connected. The routing control request message may include an EPS bearer ID/flow ID appropriate for simultaneous transmission; and routing type/rule of each EPS bearer/flow. Also, the routing control request message can include all of the routing rules for each routing type. The routing control request message may be used for the P-GW to finally determine one routing type or rule.

Step S650 to S660 are the same respectively as step S540 to S550 of FIG. 19. Therefore, descriptions are omitted.

In step S670, the P-GW applies the determined routing type/rule and notifies the entity of the LTE system of the application of the determined routing type/rule by transmitting a routing control response message to the entity of the LTE system. The routing control response message may include a result (acceptance or rejection) as a response to a request of the entity of the LTE system, EPS bearer ID/flow ID to which simultaneous transmission has been applied, and routing type/rule applied for the corresponding EPS bearer/flow. If the routing type is bandwidth/U-plane segregation, each P-GW may stop DL data transmission.

In step S680, if the result included in the routing control response message is "accept", the entity of the LTE system stores information for simultaneous transmission to an HSS, for example. And the entity of the LTE system transmits information for simultaneous transmission to the multi-RAT device. The MME may transmit information for simultaneous transmission to the eNB through an existing S1 message such as the initial context setup request message, and the eNB may transmit the information for simultaneous transmission to the multi-RAT device by using an existing message such as the RRC connection reconfiguration message. The entity of the LTE system can transmit a different ID (for example, E-RAB ID, DRB ID, or LCID) mapped to the corresponding EPS bearer ID additionally or may transmit the different ID by replacing the corresponding EPS bearer ID. Meanwhile, if the result included in the routing control response message is "reject", the entity of the LTE system may transmit "service reject" to the multi-RAT device.

Upon receiving the information for simultaneous transmission, the multi-RAT device may perform an operation (UL data transmission) according to the corresponding routing type/rule. Also, if the routing type is bandwidth/U-plane segregation and transmission RAT system is an LTE system, the multi-RAT device may stop transmission of UL data of the corresponding EPS bearer through the Wi-Fi system.

In step S690, the eNB transmits a radio bearer establishment result in association with the multi-RAT device to the MME through an existing S1 message such as the initial context setup request message.

In step S700, the MME transmits the radio bearer establishment result in association with the multi-RAT device to the P-GW through an existing S1 message such as the modify bearer request message. The P-GW may resume transmission of DL data. If radio bearer establishment is successful, the P-GW may resume transmission of the corresponding data through the LTE system, whereas, if the radio bearer establishment fails, the P-GW may resume transmission of the corresponding data through the Wi-Fi system.

Figure 21:
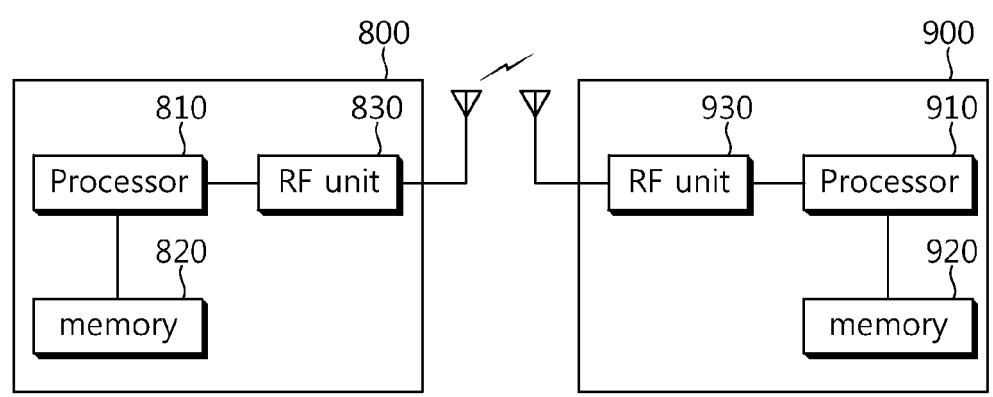
FIG. 21 shows a wireless communication system to implement an embodiment of the present invention.

FIG. 21 shows a wireless communication system to implement an embodiment of the present invention.

An entity of an LTE system 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A multi-RAR device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing, by an entity of a primary radio access technology (RAT) system, a session in a wireless communication system, the method comprising:
   receiving a requested routing type for each bearer, a requested routing rule for each bearer, and a measurement result for a secondary RAT system from a multi-RAT device;
   determining which packet data network (PDN) is appropriate for simultaneous transmission through the primary RAT system and the secondary RAT system based on the requested routing type for each bearer, the requested routing rule for each bearer, network load of both the primary RAT system and the secondary RAT system, a quality of service (QoS) of each bearer and the received measurement result;
   transmitting a create session request message to a PDN gateway (P-GW) corresponding to a PDN which is determined to be appropriate for simultaneous transmission through the primary RAT system and the secondary RAT system;
   receiving a create session response message including information on the simultaneous transmission through the primary RAT system and the secondary RAT system from the P-GW; and
   establishing a session of the primary RAT system based on the information on the simultaneous transmission with the multi-RAT device,
   wherein the QoS includes a quality class identifier (QCI), an allocation and retention priority (ARP), a bit rate of traffic per bearer, and bit rates of traffic per group of bearers.

2. The method of claim 1, further comprising:
   before receiving the measurement result, transmitting a measurement configuration for the secondary RAT system to the multi-RAT device,
   wherein the measurement result for the secondary RAT system is based on the measurement configuration.

3. The method of claim 2, wherein the measurement configuration is triggered by one of an eNodeB (eNB), a mobility management entity (MME), or the P-GW.

4. The method of claim 1, wherein the measurement result is received via a tracking area update (TAU) request message.

5. The method of claim 1, wherein the measurement result is received via one of a connection request message, connection setup complete message, or a measurement report message.

6. The method of claim 5, wherein the connection setup complete message includes a "logMeasAvailable" parameter which is set to "true".

7. The method of claim 1, wherein establishing the session of the primary RAT system comprises transmitting one of a radio resource control (RRC) connection release message, a paging message, or a non-access stratum (NAS) attach request message to the multi-RAT device.

8. The method of claim 1,
   wherein the primary RAT system is a 3rd generation partnership project (3GPP) long-term evolution (LTE) system, and
   wherein the secondary RAT system is an institute of electrical and electronics engineers (IEEE) 802.11 system.

9. The method of claim 1, wherein the entity of the primary RAT system is one of an eNodeB (eNB), a mobility management entity (MME), or a new entity.

10. A device of a primary radio access technology (RAT) system, the device configured to establish a session in a wireless communication system, the device comprising:
    a transceiver;
    a memory; and
    a processor operatively connected to the transceiver and the memory, the processor configured to:
       receive a requested routing type for each bearer, a requested routing rule for each bearer, and a measurement result for a secondary RAT system from a multi-RAT device;
       determine which packet data network (PDN) is appropriate for simultaneous transmission through the primary RAT system and the secondary RAT system based on the requested routing type for each bearer, the requested routing rule for each bearer, network load of both the primary RAT system and the secondary RAT system, a quality of service (QoS) of each bearer and the received measurement result;
       transmit a create session request message to a PDN gateway (P-GW) corresponding to a PDN which is determined to be appropriate for simultaneous transmission through the primary RAT system and the secondary RAT system;
receive a create session response message including information on the simultaneous transmission through the primary RAT system and the secondary RAT system from the P-GW; and establish a session of the primary RAT system based on the information on the simultaneous transmission with the multi-RAT device,
wherein the QoS includes a quality class identifier (QCI), an allocation and retention priority (ARP), a bit rate of traffic per bearer, or bit rates of traffic per group of bearers.

* * * * *